(12) United States Patent
Kim

(10) Patent No.: US 9,671,012 B2
(45) Date of Patent: Jun. 6, 2017

(54) VEHICLE SHIFT LEVER APPARATUS

(71) Applicant: Hyundai Motor Company, Seoul (KR)

(72) Inventor: Eun Sik Kim, Gwangmyeong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/934,552

(22) Filed: Nov. 6, 2015

(65) Prior Publication Data

US 2016/0369888 A1  Dec. 22, 2016

(30) Foreign Application Priority Data

Jun. 17, 2015 (KR) .................. 10-2015-0086109

(51) Int. Cl.
| | |
|---|---|
| *F16H 59/10* | (2006.01) |
| *F16H 61/36* | (2006.01) |
| *F16H 59/08* | (2006.01) |
| *F16H 61/26* | (2006.01) |
| *F16H 59/02* | (2006.01) |

(52) U.S. Cl.
CPC ............ *F16H 59/10* (2013.01); *F16H 59/02* (2013.01); *F16H 59/0278* (2013.01); *F16H 59/08* (2013.01); *F16H 61/26* (2013.01); *F16H 61/36* (2013.01); *F16H 2059/026* (2013.01); *F16H 2059/0295* (2013.01)

(58) Field of Classification Search
CPC ....... F16H 2059/026; F16H 2059/0295; F16H 2059/0273; F16H 59/02; F16H 59/08; F16H 59/10; F16H 59/0278; F16H 61/26; G05G 2009/04703; G05G 2009/04714; G05G 2009/04766; G05G 2009/04718; G05G 9/00; G05G 9/02; G05G 9/04; G05G 9/10; G05G 9/047; G05G 9/06; B60K 20/02
See application file for complete search history.

(56) References Cited

U.S. PATENT DOCUMENTS

| | | | | | |
|---|---|---|---|---|---|
| 4,638,678 | A | * | 1/1987 | Gorman | ........... F16H 61/18 74/473.22 |
| 5,868,620 | A | * | 2/1999 | Wada | ........... A63F 13/06 463/38 |
| 5,884,529 | A | * | 3/1999 | Meyer | ........... F16H 59/0204 74/473.18 |
| 6,029,537 | A | * | 2/2000 | Nagao | ........... F16H 59/044 273/148 B |

(Continued)

FOREIGN PATENT DOCUMENTS

| | | | |
|---|---|---|---|
| DE | 4128161 A1 * | 3/1992 | ........ F16H 59/04 |
| JP | 8-233076 A | 9/1996 | |
| JP | 2014-52794 A | 3/2014 | |

(Continued)

*Primary Examiner* — William Kelleher
*Assistant Examiner* — Joseph H Brown
(74) *Attorney, Agent, or Firm* — Morgan Lewis & Bockius LLP

(57) ABSTRACT

A vehicle shift lever apparatus may include a support bracket configured to be coupled to a vehicle body, an actuating bar disposed at the support bracket so as to elastically move axially and rotate axially, a shift lever coupled to the actuating bar to move the actuating bar axially or rotate the actuating bar axially depending on an operation thereof, and a cable interlocked with the actuating bar to longitudinally guide the axial movement or the axial rotation of the actuating bar.

10 Claims, 8 Drawing Sheets

(56) References Cited

U.S. PATENT DOCUMENTS 9,057,400 B2 *   6/2015   Junvik ................... F16C 1/103

FOREIGN PATENT DOCUMENTS

| KR | 20-1998-068111 U | 12/1998 |
| KR | 10-2003-0029715 A | 4/2003 |
| KR | 10-2003-0033604 A | 5/2003 |
| KR | 10-2010-0125080 A | 11/2010 |
| KR | 10-2013-0059065 A | 6/2013 |

* cited by examiner

VEHICLE SHIFT LEVER APPARATUS

CROSS REFERENCE TO RELATED APPLICATION

The present application claims priority to Korean Patent Application No. 10-2015-0086109, filed Jun. 17, 2015, the entire contents of which is incorporated herein for all purposes by this reference.

BACKGROUND OF THE INVENTION

Field of the Invention

The present invention relates to a vehicle shift lever apparatus, and more particularly, to a vehicle shift lever apparatus capable of improving an operating force of a shift lever and reducing a required space.

Description of Related Art

A shift of a vehicle equipped with a manual transmission is made by moving a shift lever provided with a driver's side to a set position.

The shift lever is connected to a shift wire and a select wire which are connected to a transmission. By this configuration, the level of the transmission is changed by pulling or pushing the shift wire or the select wire when the shift lever is operated.

In detail, FIG. 1 is a diagram illustrating a typical shift lever apparatus. The typical shift lever apparatus includes a lever rod 10 operated by a driver, a ball-shaped hinge 11 coupled with the lever rod 10 to support the lever rod 10 to a case, a shift rod 12 integrally coupled with an end of the lever rod 10 to move together with the shift rod 12 and the lever rod 10 when the operation of the lever rod 10 is operated and coupled with the shift wire, and a select lever 20 coupled with the lever rod 10 and installed at a position corresponding to the hinge 11 to rotate at the time of the selecting operation of the lever rod 10.

The lever rod 10 may move in a shifting direction and a selecting direction based on the hinge 11 and the shift rod 12 and the select lever 20 are integrally coupled with the lever rod 10 to move together with the lever rod 10 together when the lever rod 10 is operated.

However, the typical shift lever apparatus has a problem in that the lever rod 10 is operated based on the ball-shaped hinge 11, and therefore a friction area between the hinge 11 and the case is extended and an operating feeling is insensitive.

Further, since the shift rod 12 and the select lever 20 are integrally coupled with the lever rod 10, there is a problem in that the shift rod 12 moves together with the lever rod 10 at the time of the shifting movement of the lever rod 10 to increase a rotating radius of the shift rod 12 and since the select lever 20 and the shift rod 12 also move together even at the time of the selecting movement of the lever rod 10, there is a problem in that a wide space for securing the operating range of the shift rod 12 is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle shift lever apparatus capable of improving an operating force of a shift lever and reducing a required space.

According to various aspects of the present invention, a vehicle shift lever apparatus may include a support bracket configured to be coupled to a vehicle body, an actuating bar disposed at the support bracket so as to elastically move axially and rotate axially, a shift lever coupled to the actuating bar to move the actuating bar axially or rotate the actuating bar axially depending on an operation thereof, and a cable interlocked with the actuating bar to longitudinally guide the axial movement or the axial rotation of the actuating bar.

The support bracket may include a pair of support panels spaced apart from each other at a predetermined interval and facing each other, and each support panel may be provided with coupling holes into which the actuating bar is inserted.

The coupling holes may be inserted with bearings supporting the axial rotation of the actuating bar.

Both ends of the actuating bar may each be provided with locking projections and elastic bodies may each be provided between each of the locking projections and the support panel to allow the actuating bar elastically to move axially.

The locking projection formed at one end of the actuating bar between the locking projections may be formed in a circular flange shape.

Each locking projection may be formed at an outer side of the support panel.

The actuating bar may be provided with a coupling notch to axially form a pitch and the coupling notch may be formed to have a predetermined width in a direction vertical to the axial direction of the actuating bar.

An end of the shift lever may be provided with a nib inserted into the coupling notch in a longitudinal direction of the shift lever, the nib may be formed with a predetermined width along a width of the coupling notch, and the actuating bar may be configured to move axially or rotate axially depending on the operation of the shift lever.

The vehicle shift lever apparatus may further include a sliding bracket axially sliding the actuating bar while enclosing an outer circumference of the actuating bar and having both ends rotatably shaft-coupled to the shift lever to support the axial rotation of the actuating bar of the shift lever.

The cable may include a first cable and a second cable, the sliding bracket may be provided with a coupling projection, and the coupling projection may be coupled to the first cable to longitudinally move depending on the axial rotation of the actuating bar.

The vehicle shift lever apparatus may further include a cable socket partially enclosing the first cable and fixed to a vehicle body or a support bracket, in which a sectional shape of a hole through which the first cable is inserted may be formed in an oval shape long in a length direction of the shift lever.

The cable may include a first cable and a second cable and the support bracket may further be provided with a link rotatably shaft-supported to the support bracket, may have a first end contact the locking projection of one end of the actuating bar and a second end coupled with the second cable, and may be configured to rotate when the actuating bar axially moves to longitudinally move the second cable.

One end of the link may be provided with the locking notch and the locking notch may be provided with a groove to be vertical to the locking projection of the one end of the actuating bar.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
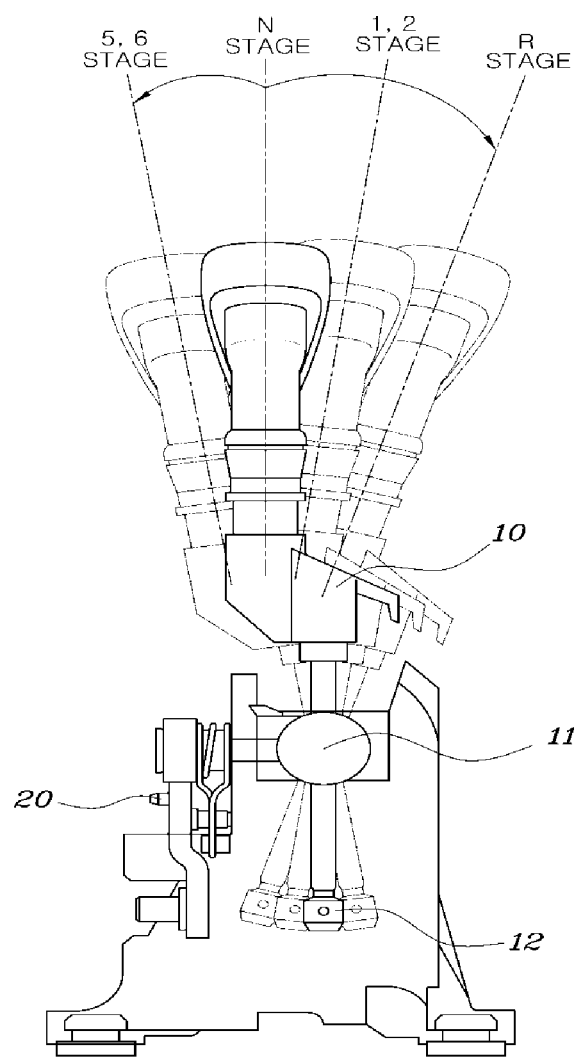
FIG. 1 is a configuration diagram of a typical shift lever apparatus of a related art.
Figure 2:
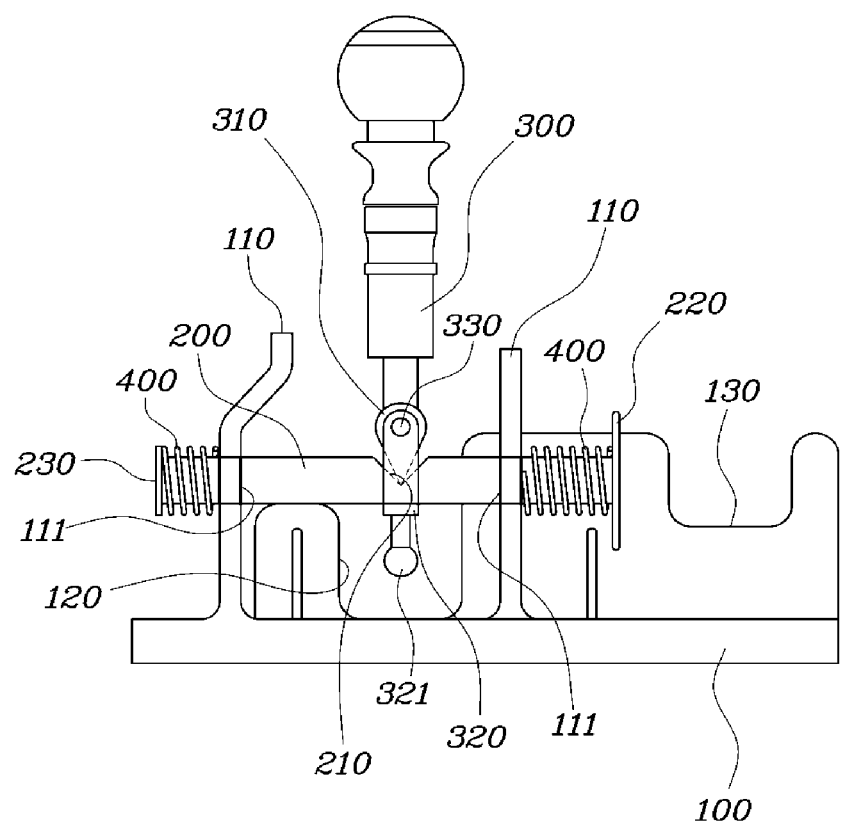
FIG. 2 is a configuration diagram of an exemplary vehicle shift lever apparatus according to the present invention.
Figure 3:
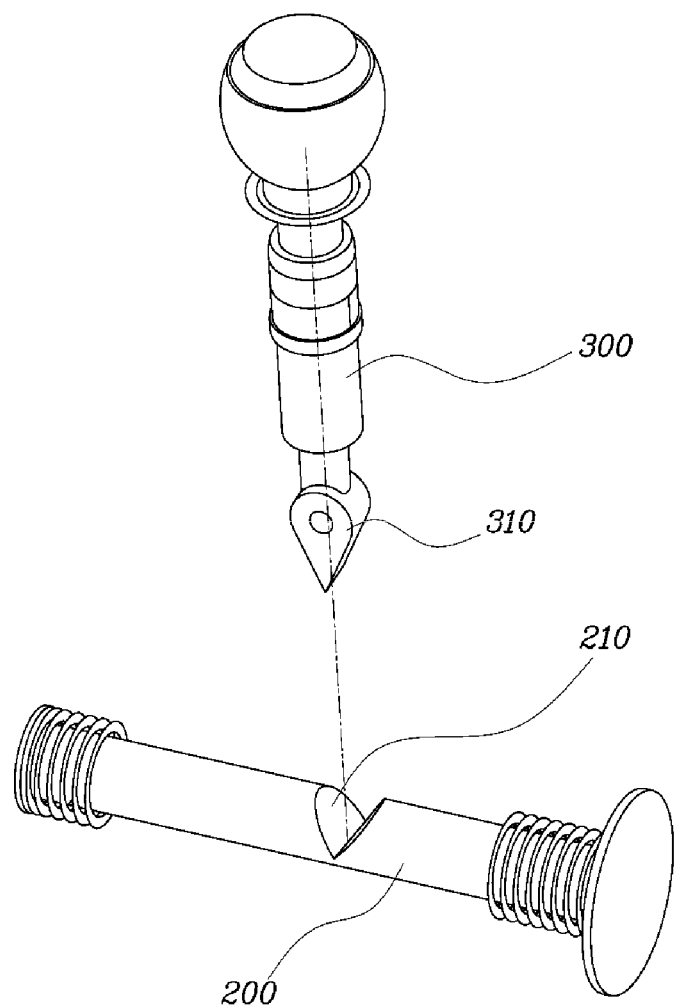
FIG. 3 is a diagram illustrating a coupling notch of a nib and an actuating bar of the exemplary vehicle shift lever apparatus according to the present invention.
Figure 4:
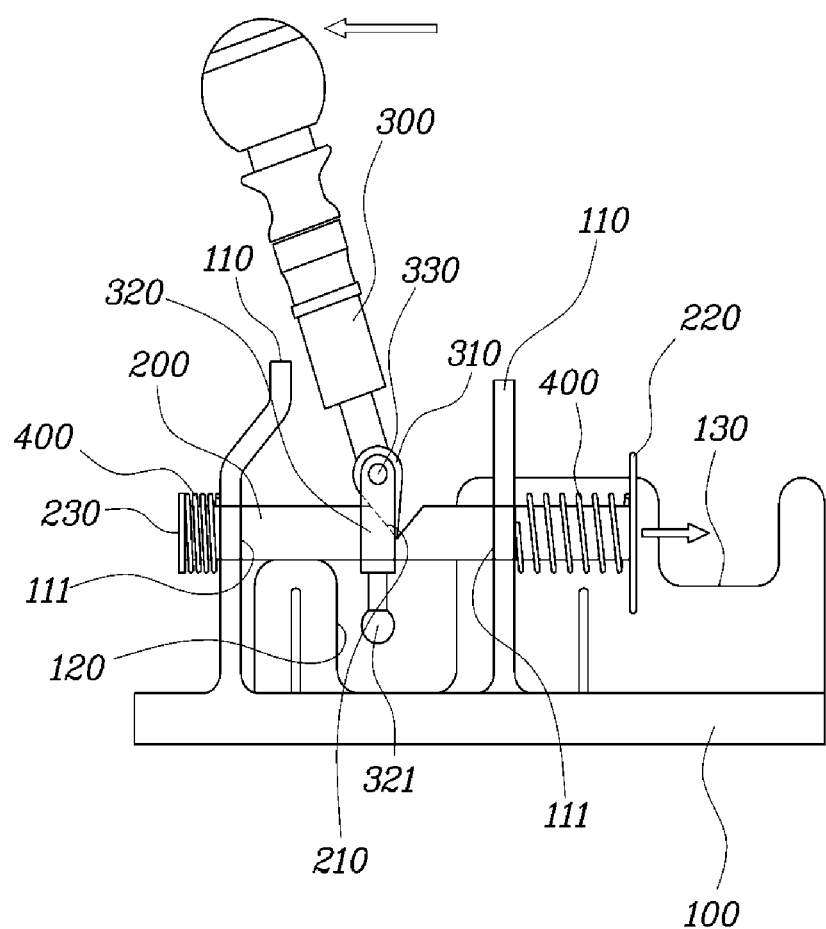
FIG. 4 is a diagram an operating appearance at the time of selecting of the exemplary vehicle shift lever apparatus according to the present invention.
Figure 5:
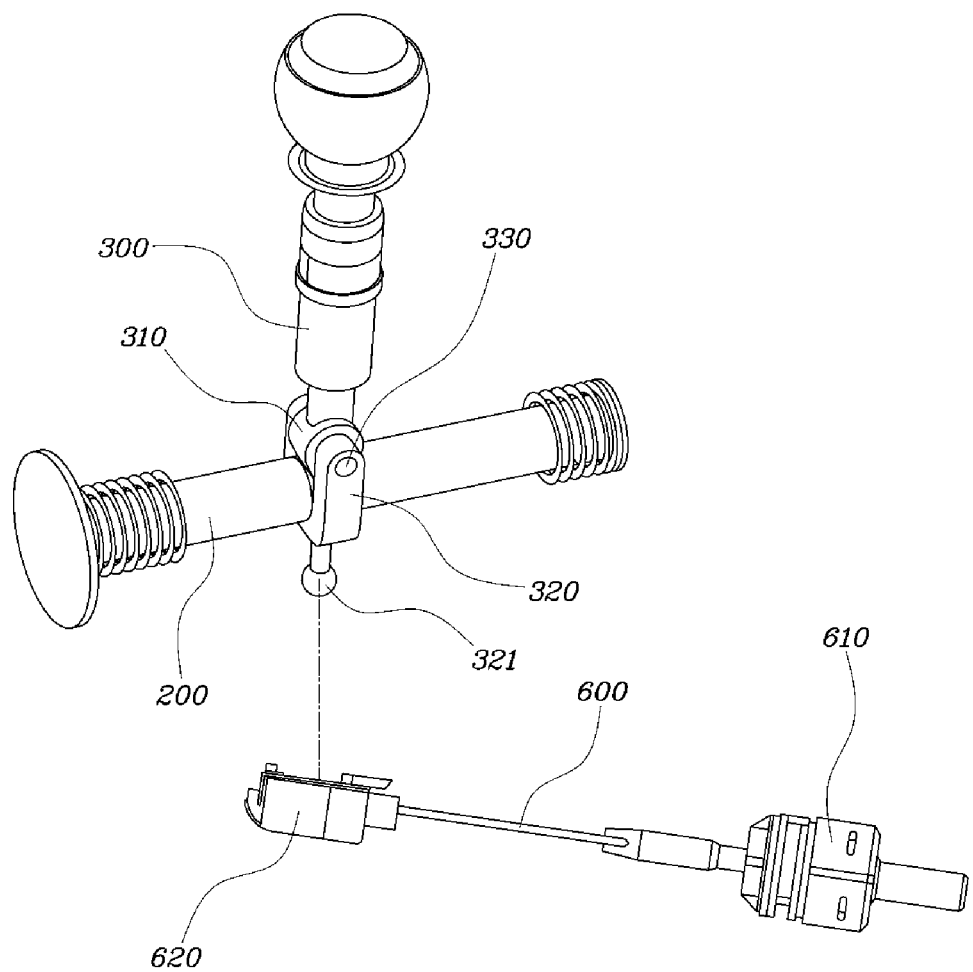
FIG. 5 is a diagram illustrating a coupling between a first cable and a sliding bracket of the exemplary vehicle shift lever apparatus according to the present invention.
Figure 6:
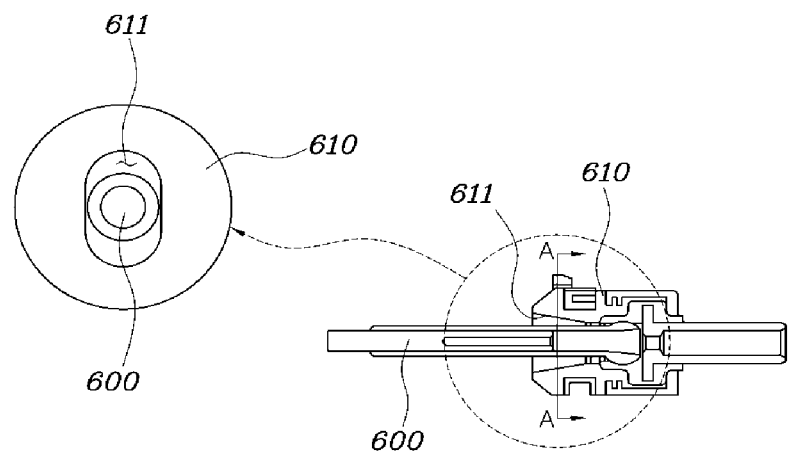
FIG. 6 is a cross-sectional view of the first cable according to the present invention.
Figure 7:
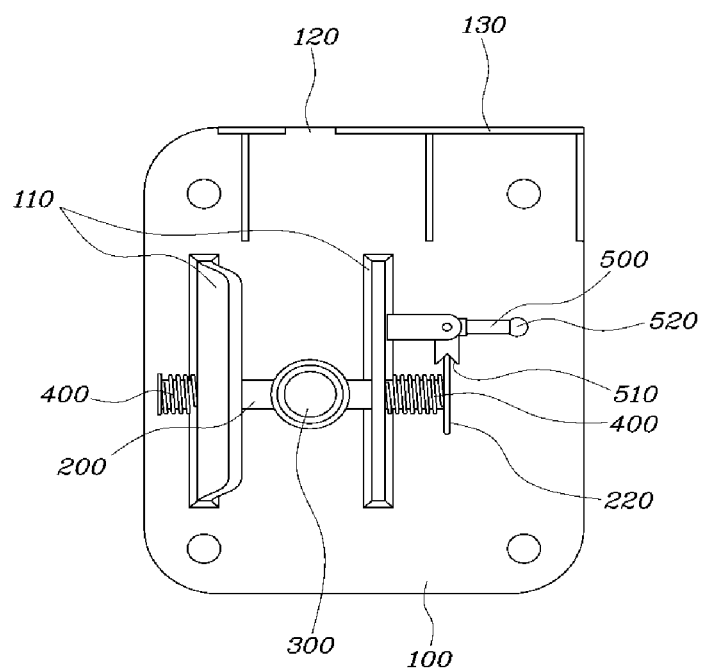
FIG. 7 and FIG. 8 are upper side views of FIG. 2.
Figure 8:
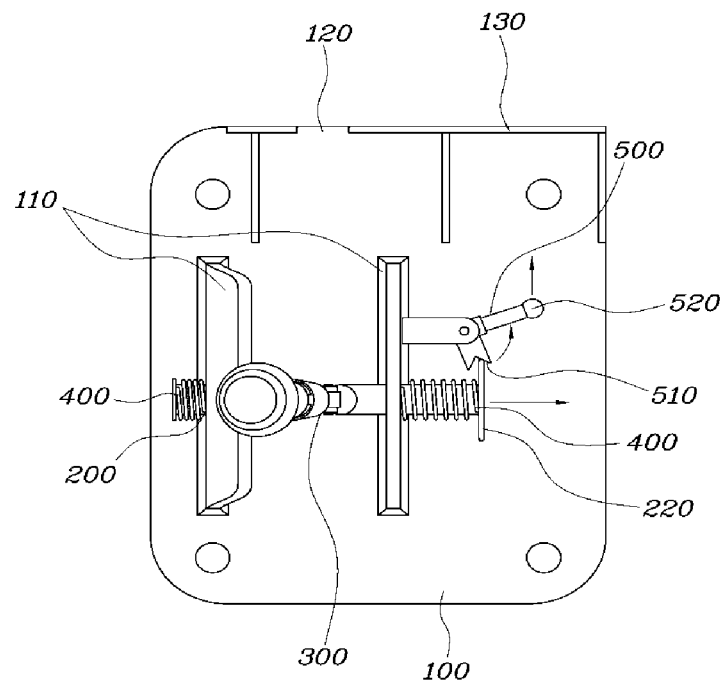
Figure 9:
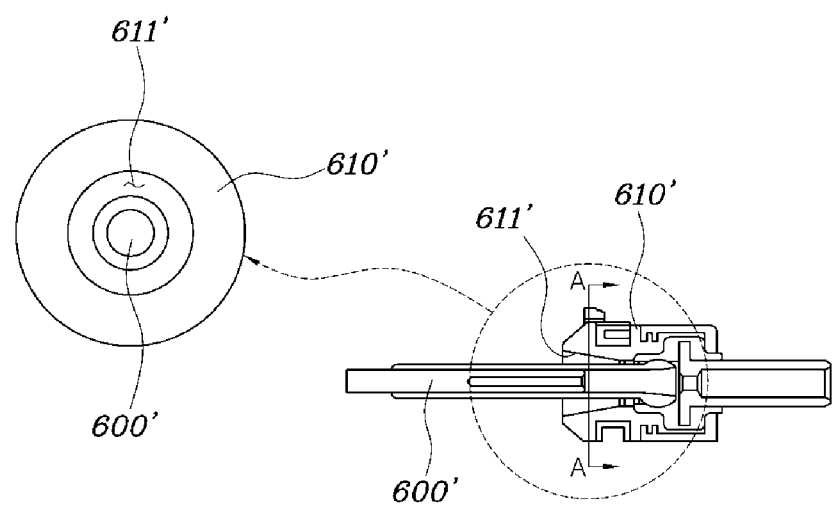
FIG. 9 is a cross-sectional view of a second cable of the exemplary vehicle shift lever apparatus according to the present invention.
Figure 10:
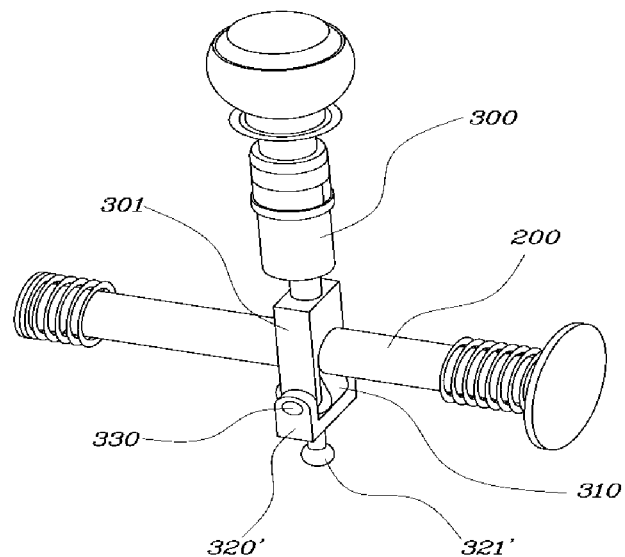
FIG. 10 is a configuration diagram of an exemplary vehicle shift lever apparatus according to the present invention.
Figure 11:
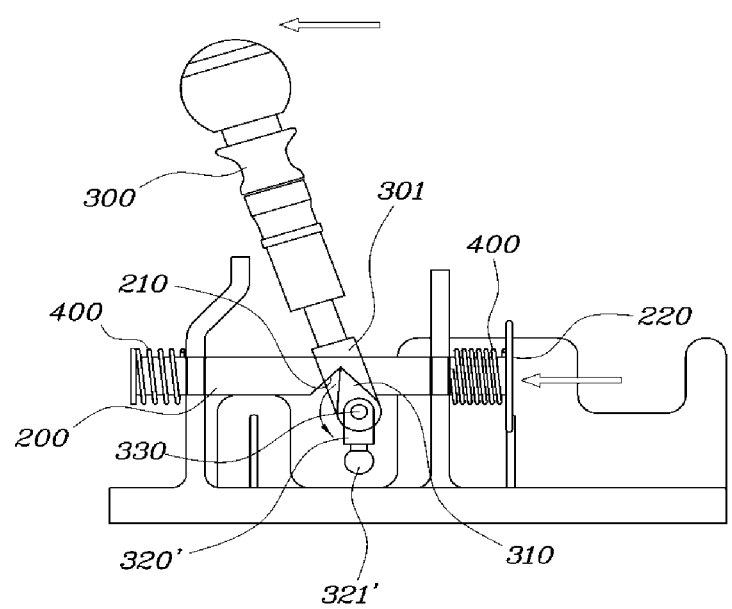
FIG. 11 is a diagram illustrating an operating appearance at the time of selecting according to the present invention.

FIG. 1 is a configuration diagram of a typical shift lever apparatus, FIG. 2 is a configuration diagram of a vehicle shift lever apparatus according to various embodiments of the present invention, FIG. 3 is a diagram illustrating a coupling notch of a nib and an actuating bar according to various embodiments of the present invention, FIG. 4 is a diagram an operating appearance at the time of selecting of the vehicle shift lever apparatus according to various embodiments of the present invention, FIG. 5 is a diagram illustrating a coupling between a first cable and a sliding bracket according to various embodiments of the present invention, FIG. 6 is a cross-sectional view of the first cable according to various embodiments of the present invention, FIGS. 7 and 8 are upper side views of FIG. 2, FIG. 9 is a cross-sectional view of a second cable according to various embodiments of the present invention, FIG. 10 is a configuration diagram of a vehicle shift lever apparatus according to various embodiments of the present invention, and FIG. 11 is a diagram illustrating an operating appearance at the time of selecting according to various embodiments of the present invention.

FIG. 2 is a configuration diagram of the vehicle shift lever apparatus according to various embodiments of the present invention. The vehicle shift lever apparatus includes a support bracket 100 coupled with a vehicle body, an actuating bar 200 installed at the support bracket 100 so as to elastically move axially and rotate axially, a shift lever 300 coupled with the actuating bar 200 to let the actuating bar 200 move axially or rotate axially depending on the operation, and a cable 600 interlocking with the actuating bar 200 to longitudinally move depending on the axial movement or the axial rotation of the actuating bar 200. The cable 600 will be described below with reference to FIGS. 5 and 6.

As illustrated in FIG. 2, the support bracket 100 includes a pair of support panels 110 spaced apart from each other at a predetermined interval and facing each other and each support panel 110 may be provided with coupling holes into which the actuating bar 200 is inserted. Further, the coupling holes may be inserted with bearings supporting the axial rotation of the actuating bar 200.

Therefore, the actuating bar 200 longitudinally supports the support panel 110 while penetrating through the support panel 110 and may reduce a friction force against the axial rotation of the actuating bar 200 due to the bearing 111 provided between the actuating bar 200 and a circumference portion of the coupling hole.

Further, both ends of the actuating bar 200 are each provided with locking projections 220 and 230 and elastic bodies 400 are each provided between each of the locking projections 220 and 230 and the support bracket 100, preferably, the locking projectors 220 and 220 and the support panel 110 to let the actuating bar 200 elastically move axially. Here, the axial direction may be a longitudinal direction of the actuating bar 200.

The elastic body 400 is preferably a compression spring, but is not necessarily limited thereto. Therefore, various elastic bodies 400 performing similar functions thereto may be used. Further, the pair of locking projections 220 and 230 may be formed at the actuating bar 200 to be positioned at an inner side of the support panel 110. More preferably, the pair of locking projections 220 and 230 may be positioned at an outer side of the support panel to sufficiently secure an installation space of a link 500 to be described below and prevent a mutual interference with the shift lever 300.

The elastic body 400 may be positioned between the locking projections 220 and 230 and the support panel 110 at the outer side of the support panel 110 and both ends thereof may be each installed to be supported to the locking projections 220 and 230 or the support panel 110 while enclosing an outer circumferential portion of the actuating bar 200 to secure a space and implement a function of the elastic body 400.

The elastic bodies 400 are provided in pair at both ends of the actuating bar 200, respectively and may be configured so that when any one of both ends is compressed, the other thereof is expanded. By this configuration, when an external force applied to the shift lever 300 is removed, the elastic body 400 may return to a preset position.

Further, both ends of each elastic body 400 are each fixed to the support panel 110 and the locking projections 220 and 230 and thus each elastic body 400 is distorted when the actuating bar 200 axially rotates by the external force and then is restored to an original state by a torsion restoring force of the elastic body when the external force is removed, such that the shift lever 300 may be positioned at the predetermined position.

Meanwhile, with the locking projection 220 formed at one end of the actuating bar 200 between the locking projections 220 and 230 may be formed in a circular flange shape.

The locking projection 230 formed at the other end in addition to one end of the actuating bar 200 between the locking projections 220 and 230 may also formed in the flange shape. In addition to this, the shape of the locking projection 230 formed at the other end thereof may be variously formed.

The flange shape may be formed in a disc shape and the flange may be provided to protrude along a circumferential direction of the actuating bar 200.

Further, the actuating bar 200 may be provided with the coupling notch 210 to axially form a pitch and the coupling notch 210 may be formed to have a predetermined width in a direction vertical to the axial direction of the actuating bar 200.

Further, an end of the shift lever 300 is provided with a nib 310 inserted into the coupling notch 210 in a longitudinal direction of the shift lever 300, the nib 310 is formed to have a predetermined width along a width of the coupling notch 210, and the actuating bar 200 may move axially or rotate axially depending on the operation of the shift lever 300.

In detail, FIG. 3 is a diagram illustrating the coupling notch 210 of the actuating bar 200 of the nib 310 and the actuating bar 200. Here, the coupling notch 210 and the nib 310 may be formed to a V-letter shape to contact each other, and the shift lever 300 may move the actuating bar 200 along with the nib 310 in a longitudinal direction of the actuating bar 200 when being shifted in the axial direction of the actuating bar 200 by forming the predetermined width in the actuating bar 200 in a radial direction of the actuating bar 200.

An end of the nib 310 may linearly contact the coupling notch 210 at all times and when the shift lever 300 performs the selecting movement in one axial direction of the actuating bar 200, the nib 310 may push the actuating bar 200 in an opposite direction to move the actuating bar 200 in the other axial direction.

This is the same as the operating appearance at the time of the selecting illustrated in FIG. 4. When the shift lever 300 performs the selecting movement in the axial direction as illustrated in FIG. 4, the shift lever 300 rotates based on a pin 330 coupled with the nib 310 and an upper end of the shift lever 300 and an end of the nib 310 move in an opposite direction to each other.

The end of the nib 310 linearly contacts a valley of the coupling notch 210 and therefore the actuating bar 200 has a contact force enough to move axially by the rotation of the end of the nib 310. Here, the axial movement of the actuating bar 200 may be performed until an outer circumferential surface of the nib 310 having a V-letter shape face-contacts the coupling notch 210.

According to the various embodiments of the present invention, the nib 310 and the coupling notch 210 have a V-letter shape but the shapes thereof are not limited thereto. Therefore, the nib 310 and the coupling notch 210 may not necessarily have a structure in which they are completely meshed with each other. Any shape may be allowed as long as each shape has a structure in which the nib 310 lets the actuating bar 200 move axially or rotate axially.

Meanwhile, as illustrated in FIGS. 2 and 5, a sliding bracket 320 may be further provided to axially slide the actuating bar 200 while enclosing the outer circumference of the actuating bar 200 and has both ends thereof rotatably shaft-coupled with the shift lever 300 to support the axial rotation of the actuating bar of the shift lever 300.

Both ends of the sliding bracket 320 extend while enclosing the actuating bar 200 downward from top and the actuating bar 200 extending upward is coupled with the pin 330 to support the pin 330. Therefore, the shift lever 300 may rotate in the axial direction of the actuating bar 200 based on the supported pin 330.

Further, the cable includes a first cable 600 and a second cable 610' and the sliding bracket 320 may be provided with a coupling projection 321' protruding downward and the coupling projection 321 is coupled with the first cable 600 to longitudinally move depending on the axial rotation of the actuating bar 200.

In detail, as illustrated in FIG. 5, the coupling projection 321 extends downward of the actuating bar 200 from the sliding bracket and an end thereof may be coupled with an end of the first cable 600. Further, the end of the first cable 600 may be further provided with a fastening bracket 620 and the end of the coupling projection 321 has a ball shape to be fitted in the fastening bracket 620 and coupled.

The sliding bracket 320 is integrally coupled with the nib 310 via the pin 330 to axially rotate along with the actuating bar 200 when the shift lever 300 is shifted and pulls or pushes the first cable by the rotation.

Meanwhile, FIG. 6 is a cross-sectional view of the first cable 600. Here, a cable socket 610 partially enclosing the first cable 600 and fixed to a first fixing groove 120 formed at a vehicle body or the support bracket 100 is further provided and a cross section of a through hole 611 formed in the cable socket 610 through which the first cable 600 penetrates may be formed in an oval shape long in a length direction of the shift lever 300.

The right of FIG. 6 illustrates a cross section of the cable socket 610 and the first cable and the left of FIG. 6 illustrates the section A-A of the right cross-sectional view.

According to various embodiments of the present invention, the shift lever 300 is disposed vertically and therefore the through hole 611 may be formed to form an oval in a vertical direction.

Describing in more detail, when the nib 310 axially moves the actuating bar while rotating against the pin 330, the nib 310 keeps on contacting the coupling notch 210 and thus the coupled point with the pin 330 partially moves down. In this case, the pin 330 and the sliding bracket 320 move downward together. Further, the pin 330 and the sliding bracket 320 move upward at the time of the returning of the actuating bar 200.

Therefore, according to various embodiments of the present invention, the first cable 600 may be configured to vertically move by a predetermined section and the through hole 611 may be formed in an oval shape long up and down to secure the vertical mobility of the first cable 600.

On the other hand, a lateral movement of the first cable 600 is limited and thus may be prevented from moving together with the axial movement of the actuating bar 200. Further, the lateral movement of the first cable 600 is limited after the first cable 600 vertically moves by a predetermined section and thus the first cable 600 may be configured to support the sliding bracket 320.

Further, the direction of the through hole 611 may be variously set in addition to a vertical direction and therefore may be set along a longitudinal direction of the shift lever 300 or a longitudinal length of the nib 310.

The first cable 600 and the second cable to be described below may also be formed in a wire shape, but may be preferably formed in a bar shape. Further, the first cable 600 and the second cable may be formed in various shapes.

Meanwhile, FIG. 7 is an upper side view of FIG. 2. The vehicle shift lever apparatus according to various embodiments of the present invention may be provided with a link 500 which is rotatably shaft-supported to the support bracket 100, has one end contact the locking projection 220 of one end of the actuating bar 200 and the other end thereof coupled with the second cable 600', and rotates when the actuating bar 200 axially moves to longitudinally move the second cable 600'.

In more detail, the link 500 is shaft-supported to the support panel 110 but preferably shaft-supported to rotate in the axial direction of the actuating bar 200 as illustrated in FIG. 8.

Further, one end of the link 500 is provided with the locking notch 510 and the coupling notch 210 may be provided with a groove to be vertical to a protruding direction of the locking projection 220 of one end of the actuating bar.

Therefore, both ends of the locking notch 510 may each be positioned at both sides of the locking projection 220 having a flange shape and does not affect the rotation of the link 500 even though the locking projection 220 rotates.

Further, as the locking projection 220 formed at one end of the actuating bar 200 has a circular flange, the rotation of the link 500 is not made when the actuating bar 200 axially rotates depending on the shifting of the shift lever 300 but only rotates only when the actuating bar 200 axially moves depending on the selecting of the shift lever 300.

Meanwhile, the end of the second cable 600' is coupled with the other end 520 of the link 500 and as in FIG. 9 illustrating the cross section of the second cable 600', a cable socket 610' coupled with the second fixing groove 130 formed at the support bracket 100 may be provided and a through hole 611' may be formed in a regular circle. The left of FIG. 9 illustrates the section A-A of the right and when compared with FIG. 6, it may be appreciated that the through hole 611 is not an oval but a regular circle.

The reason is that a main displacement does not vertically occur like the first cable 600 but the displacement may occur in all directions depending on the movement of the cable. To this end, it is preferable for the through hole of the cable socket 610' of the second cable 600' to have a different shape from that of the cable socket 610 of the first cable 600.

According to various embodiments of the present invention, the first cable 600 is a cable which is connected to a shift lever 300 of the transmission and the second cable 600' is a cable which is connected to the link 500, but a connection structure or a shape of the cables may be variously changed depending on a design.

As described above, according to various embodiments of the present invention, the shift lever 300 is disposed to have a vertical length and the end of the nib 310 contacts the coupling notch 210 which is opened upward while facing downward. Therefore, as illustrated in FIG. 4, the movement of the shift lever 300 and the axial movement of the actuating bar 200 face different directions.

However, in a vehicle shift lever apparatus according to various embodiments of the present invention as illustrated in FIG. 10, the coupling notch 210 is formed to be opened down, a lower end 301 of the shift lever 300 extends downward while enclosing the actuating bar 200, and the end of the nib 310 is provided to face upward from the bottom of the actuating bar 200 and thus may contact the coupling notch 210. The pin 330 is coupled with the lower end 301 of the shift lever 300 while penetrating through the nib 310 to be integrally fixed to each other and is rotatably coupled with the sliding bracket 320', such that the shift lever 300 and the nib 310 may rotate based on the pin 330.

Both ends of the sliding bracket 320' are rotatably hinge pin-coupled with the pin 330 at the bottom of the actuating bar 200 and the coupling projection 321' protrudes downward at the bottom of the nib 310 to be coupled with the fastening bracket 620 of the first cable 600.

By this configuration, as illustrated in an appearance at the time of the operation of the shift lever 300 of FIG. 11, the rotating direction of the shift lever 300 matches the rotating direction of the nib 310, and thus the rotating direction of the shift lever 300 may match the moving direction of the actuating bar 200.

Other configurations other than the changed configuration according to the various embodiments of FIG. 10 may be configured similar to the various embodiments of FIGS. 2-9.

Therefore, even though the transmission which performs selecting by pushing the second cable 600' at the time of a selection of an R stage and the transmission which performs selecting by pulling the second cable 600' are different schemes, different kinds of transmissions may be controlled only by changing some components by the various embodiments of the present invention. By doing so, the entirely different designs for each transmission are not required, thereby improving the manufacturing efficiency and saving the production cost.

Further, the vehicle shift lever apparatus having the foregoing structure uses a bearing rolling scheme having a smaller contact area than the typical spherical contact, thereby reducing and constantly maintaining the operating force.

Further, the apparatuses performing the shifting at the time of the selecting operation have limited movement, thereby minimizing the layout.

As described above, according to the vehicle shift lever apparatus, it is possible to solve the problem of the reduction in the operating feeling and the space occupancy due to the co-operation of the lever and the rod by individually operating the lever or the rod at the time of the shifting and the selecting.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A vehicle shift lever apparatus, comprising:
    a support bracket configured to be coupled to a vehicle body;
    an actuating bar mounted to the support bracket so as to elastically move axially and rotate axially;
    a shift lever coupled to the actuating bar to move the actuating bar axially or rotate the actuating bar axially depending on an operation thereof; and
    a cable interlocked with the actuating bar to longitudinally guide an axial movement or an axial rotation of the actuating bar,
        wherein the support bracket includes a pair of support panels spaced apart from each other at a predetermined interval and facing each other, and each support panel is provided with coupling holes into which the actuating bar is inserted,
        wherein the actuating bar is provided with a coupling notch to axially form a pitch and the coupling notch is formed to have a predetermined width in a direction vertical to an axial direction of the actuating bar, and
        wherein an end of the shift lever is provided with a nib inserted and mounted into the coupling notch in a longitudinal direction of the shift lever, the nib is formed with the predetermined width along a width of the coupling notch, and the actuating bar is configured to move axially or rotate axially depending on the operation of the shift lever.

2. The vehicle shift lever apparatus of claim 1, wherein the coupling holes are inserted with bearings supporting the axial rotation of the actuating bar.

3. The vehicle shift lever apparatus of claim 1, wherein both ends of the actuating bar are each provided with locking projections and elastic bodies are each provided between each of the locking projections and the support panels to allow the actuating bar to elastically move axially.

4. The vehicle shift lever apparatus of claim 3, wherein the locking projection formed at one end of the actuating bar between the locking projections is formed in a circular flange shape.

5. The vehicle shift lever apparatus of claim 4, wherein the cable includes a first cable and a second cable and the support bracket is further provided with a link rotatably shaft-supported to the support bracket, has a first end contacting the locking projection of one end of the actuating bar and a second end coupled with the second cable, and is configured to rotate when the actuating bar axially moves to longitudinally move the second cable.

6. The vehicle shift lever apparatus of claim 5, wherein one end of the link is provided with a locking notch and the locking notch is provided with a groove to be vertical to the locking projection of the one end of the actuating bar.

7. The vehicle shift lever apparatus of claim 3, wherein each locking projection is formed at an outer side of the support panel.

8. The vehicle shift lever apparatus of claim 1, further comprising:
    a sliding bracket axially sliding the actuating bar while enclosing an outer circumference of the actuating bar and having both ends rotatably shaft-coupled to the shift lever to support the axial rotation of the actuating bar of the shift lever.

9. The vehicle shift lever apparatus of claim 8, wherein the cable includes a first cable and a second cable, the sliding bracket is provided with a coupling projection, and the coupling projection is coupled to the first cable to longitudinally move depending on the axial rotation of the actuating bar.

10. The vehicle shift lever apparatus of claim 9, further comprising:
    a cable socket partially enclosing the first cable and fixed to the vehicle body or the support bracket, wherein a sectional shape of a hole through which the first cable is inserted is formed in an oval shape long in a length direction of the shift lever.

* * * * *